United States Patent [19]

Kaneko et al.

[11] 4,429,399

[45] Jan. 31, 1984

[54] GAS LASER TUBE

[75] Inventors: Takashi Kaneko; Tokihiko Shidara, both of Yokohama, Japan

[73] Assignee: Tokyo Shibaura Denki Kabushiki Kaisha, Kawasaki, Japan

[21] Appl. No.: 240,237

[22] Filed: Mar. 3, 1981

[51] Int. Cl.³ .............................................. H01S 3/03
[52] U.S. Cl. ....................................... 372/65; 372/61
[58] Field of Search ........................ 372/61, 81, 65, 87

[56] References Cited

U.S. PATENT DOCUMENTS 4,210,876 7/1980 Ogata .................................... 372/61

Primary Examiner—James W. Davie
Assistant Examiner—Leon Scott, Jr.
Attorney, Agent, or Firm—Cushman, Darby & Cushman

[57] ABSTRACT

A gas laser tube comprises: a cylindrical envelope; a pair of end tubes mounted at end walls of said envelope and having reflective members at open end parts thereof, said pair of end tubes being of smaller diameter than that of said envelope; a capillary tube mounted to the inner surface of one of said end walls through a capillary-holding member so as to be substantially coaxial with said end tubes inside said envelope; a cathode comprising a metal cylinder arranged in the vicinity of the inner surface of said envelope; a cathode terminal connected to said cathode and mounted to extend through said end wall to which is mounted said capillary tube; and an anode terminal protruding from a space which communicates with the interior of said capillary tube through said end wall.

3 Claims, 3 Drawing Figures

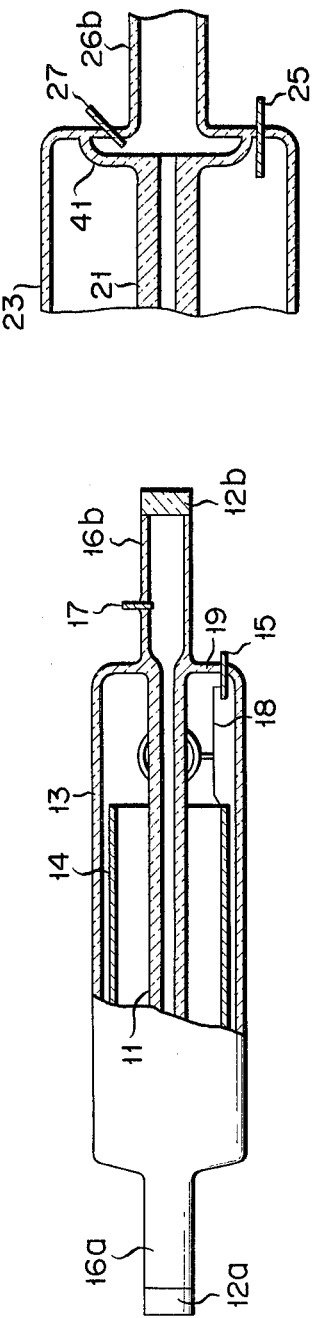
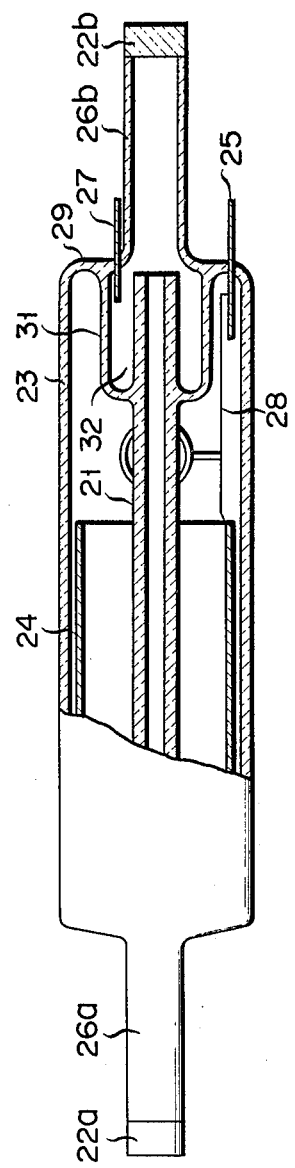
FIG. 1 PRIOR ART
FIG. 2
FIG. 3

GAS LASER TUBE

BACKGROUND OF THE INVENTION

The present invention relates to a gas laser tube and, more particularly, to an improvement in the electrode structure thereof.

A gas laser tube, such as a He-Ne gas laser tube of the structure shown in FIG. 1, is conventionally known.

Referring to FIG. 1, a capillary tube 11 of an insulating material such as glass is coaxially disposed within a cylindrical envelope 13 of glass. End tubes 16a and 16b of diameter smaller than that of the envelope 13 are connected to both ends of the envelope. One end tube 16b at the end wall of the envelope 13 is connected to the capillary tube 11. A pair of reflective mirrors 12a and 12b are disposed at the end parts of the two end tubes 16a and 16b, respectively.

The capillary tube 11 forms a single discharge path between the anode and the cathode and a laser medium, for example, a He-Ne gas mixture is sealed therein. The electrical energy is converted into light energy by the discharge of this He-Ne gas mixture. The capillary tube 11, in addition to this, functions to amplify the converted light and to determine the transversal mode of the laser beam by its position relative to a resonator structure.

The paired reflective mirrors 12a and 12b arranged at the end parts of the pair of end tubes 16a and 16b, respectively, are reflective mirrors of small light loss, prepared by depositing a dielectric multi-layer film on a glass substrate. One reflective mirror 12a has a reflectance of substantially 100% and the other reflective mirror 12b has a reflectance of 95 to 99%. The laser beam is provided from the reflective mirror 12b. These paired reflective mirrors 12a and 12b are disposed perpendicularly to the axis of the capillary tube 11 in such a manner that they are parallel to each other with high precision (e.g., with 1 m resonator length and within an inclination of 0.1 milliradian) and comprise a resonator.

A cylindrical cathode 14 of aluminum or the like, the surface of which is oxidized, is disposed inside the cylindrical envelope 13. This cathode 14 is electrically connected through a conductor 18 to a cathode terminal 15 protruding from an end wall 19 of the envelope 13. An anode terminal 17 is implanted in the end tube 16b substantially perpendicularly to its axis. Accordingly, the cathode terminal 15 and the anode terminal 17 are at right angles.

In a laser tube of this structure, the anode terminal 17 has the following defects as to its position and shape. Since the cathode terminal 15 and the anode terminal 17 are not parallel to each other as in the case of a cathode ray tube or the like, a special socket for these terminals is difficult to prepare. Further, the anode terminal 17 is mounted to the end tube 16b of small diameter. Accordingly, when the external lead wire is connected to the anode terminal 17, and an external force is exerted on this lead wire, the anode terminal 17 is pulled. When this force is exerted on the implanted part of the terminal 17, the end tube 16b becomes bent. Consequently, the surface of the reflective mirror 12b mounted with high precision at the end part of the end tube 16 becomes inclined, resulting in instability or a drop in the output of the laser beam. When a further force is exerted in connecting the lead wire to the anode terminal, the end tube 16b may be broken. The heat generated by discharge of the laser tube causes a temperature gradient in the direction perpendicular to the tube axis, that is, in the vertical direction. The thermal expansion caused by this acts to bend the laser tube. This phenomenon is unavoidable for a laser tube regardless of its scale. When this phenomenon is extreme, the laser oscillation may be interrupted due to this phenomenon. Since the end tubes 16a and 16b are small in diameter, they are more susceptible to the effects of this phenomenon. The mounting of the anode terminal 17 to the end tube 16b results in asymmetry of the end tubes 16a and 16b, adversely affecting the output stability and the beam stability. Although a ring-shaped anode terminal comprising a part of the end tube is known, it has drawbacks in that much labor and many parts are required for hermetic sealing.

SUMMARY OF THE INVENTION

The principle object of the present invention is to provide a gas laser tube which is easy to handle and which allows higher output stability.

The present invention provides a gas laser tube comprising a cylindrical envelope; a pair of end tubes mounted at end walls of said envelope and having reflective members at open end parts thereof, said pair of end tubes being of smaller diameter than that of said envelope; a capillary tube mounted to the inner surface of one of said end walls through a capillary-holding member so as to be substantially coaxial with said end tubes inside said envelope; a cathode comprising a metal cylinder arranged in the vicinity of the inner surface of said envelope; a cathode terminal connected to said cathode and mounted to extend through said end wall to which is mounted said capillary tube; and an anode terminal protruding from a space which communicates with the interior of said capillary tube through said end wall.

BRIEF DESCRIPTION OF THE DRAWINGS

FIG. 1 is a sectional view of a conventional gas laser tube;

FIG. 2 is a sectional view of a gas laser tube according to one embodiment of the present invention; and FIG. 3 is a sectional view of the electrode structure of a gas laser tube according to a modification of the present invention.

DETAILED DESCRIPTION OF THE PREFERRED EMBODIMENT

One embodiment of the gas laser tube of the present invention will be described in detail, with reference to FIG. 2.

Referring to FIG. 2, a capillary tube 21 of an insulating material such as glass having an inner diameter of 1.2 mm and a length of 180 mm is arranged substantially coaxially inside a cylindrical envelope 23 comprising a glass tube of, for example, about 30 mm outer diameter. One end of the capillary tube 21 is open to the interior of the cylindrical envelope 23, and the other end is welded through a holder tube 31 to a stem portion 29 comprising one of the end walls of the cylindrical envelope 23. A cylindrical cathode 24 of aluminum or the like, the surface of which is oxidized, is disposed in the vicinity of the inner wall of the cylindrical envelope 23. End tubes 26a and 26b of smaller diameter than that of the envelope 23 are mounted through the flange portion at both ends of the cylindrical envelope 23 so as to be coaxial with the envelope 23. Reflective mirrors 22a and 22b are hermetically sealed at the open ends of the end tubes 26a and 26b in such a manner that they are parallel to each other and are perpendicular to the tube axis. These paired reflective mirrors 22a and 22b are reflective mirrors of small light loss, prepared by depositing a dielectric multi-layer film on a glass substrate. One reflective mirror 22a has a reflectance of substantially 100%. The other reflective mirror 22b has a reflectance of 95 to 99%. The laser beam is obtained from the reflective mirror 22b. These paired reflective mirrors 22a and 22b are disposed perpendicular to the axis of the capillary tube 21 in such a manner that they are parallel to each other with high precision (e.g., with 1 m resonator length and within an inclination of 0.1 milliradian) and comprise a resonator. A He-Ne gas mixture as a laser medium is sealed at about 3 Torr within the laser tube of this construction.

A metal cathode terminal 25 is hermetically mounted to the stem portion 29 comprising one of the end walls of the cylindrical envelope 23 or a flange portion of the end tube 26b, so as to be parallel to the axis of the tube. The cathode terminal 25 and the cathode 24 are connected by a conductor 28 of stainless steel or the like.

As has already been described, the capillary tube 21 is welded at its end part to the stem portion 29 through a holder tube 31 of larger diameter than those of the capillary tube 21 and the end tube 26b. The end portion of the capillary tube 21 extends inside the holder tube 31, defining an annular space 32 of larger diameter than that of the end tube 26b between the capillary tube 21 and the holder tube 31. An anode terminal 27 comprising a metal rod hermetically mounted to the stem portion 29 in such a manner that it extends from the space 32 through the stem portion 29 to the outside of the tube, so as to be substantially parallel to the cathode terminal 25.

The gas laser tube of the structure described above has the advantages over the prior art laser tube to be described below.

First, the anode terminal 27 is not mounted to the end tube 26b of small diameter, but is present at a space near the capillary tube end. Due to this, the paired end tubes 26a and 26b are symmetrical so that the output stability and the beam position stability of the laser beam are improved over those of the prior art laser tube.

Second, since the anode terminal 27 and the cathode terminal 25 are mounted to the stem portion 29 which is relatively strong among the parts of the laser tube, the handling of the gas laser tube is easy.

Third, since the distance between the anode terminal 27 and the reflective mirror 22 is longer than that of the prior art gas laser tube, contamination of the reflective mirror due to scattering of the anode terminal material caused by discharge is reduced.

Fourth, since it is possible to simultaneously implant the anode terminal 27 and the cathode terminal 25 in the stem portion 29 during manufacture of the stem portion 29, the manufacturing process may be shortened.

Fifth, since the anode terminal 27 and the cathode terminal 25 are parallel to each other, preparation of a socket for electrically connecting these terminals 25 and 27 with the power source is easy. Further, since the distances of the anode terminal 27 and the cathode terminal 25 from the tube axis are different, the terminals may not be erroneously inserted into the socket.

A modification of the gas laser tube of the present invention will now be described.

In the above embodiment, the holder tube 31 is welded at a part slightly in front of the end part of the capillary tube 21, defining an annular space between the end part of the capillary tube 21 and the holder tube 31. However, the present invention is not limited to this particular structure. Instead, a structure may be adopted wherein the part of the capillary tube 21 from the welded portion of the capillary tube 21 with the holder tube 31 to its front end is eliminated, i.e., a structure according to which, as shown in FIG. 3, the end part of the capillary tube 21 is expanded to provide a capillary holding means 41. This space need only be formed in the vicinity of the end part of the capillary tube 21 and spaced from the cathode terminal 25 so that the anode terminal 27 may be mounted to extend through the stem portion 29. It is preferable that the anode terminal be mounted parallel to the cathode terminal.

Although the anode terminal 27 and the cathode terminal 25 are on opposite sides of the tube axis, in the above embodiment, the present invention is not limited to this particular structure.

It is thus to be understood that various other modifications may be made within the scope and spirit of the present invention.

What we claim is:

1. A gas laser tube comprising:
   a cylindrical envelope;
   a pair of end tubes each mounted at one end to respective end walls of said envelope and extending outwardly therefrom along an axis and having reflective members at the other end thereof, said pair of end tubes being of smaller diameter than that of said envelope;
   a capillary tube;
   a capillary tube holding member comprising a tube which has a diameter larger than that of said end tube and whose one end part is connected to the inner surface of one of said end walls of said envelope and the other end part is connected to said capillary tube adjacent one end of said envelope together with said one end wall and said capillary tube said holding member extending inwardly from said one end wall to provide a space within said envelope together with said one end wall;
   a cathode comprising a metal cylinder arranged in the vicinity of the inner surface of said envelope;
   a cathode terminal connected to said cathode and mounted to extend through said end wall to which is mounted said capillary tube; and
   an anode terminal protruding from said space to communicate with the interior of said capillary tube through said end wall and being substantially parallel to said cathode terminal.

2. A gas laser tube according to claim 1, wherein said cathode terminal and said anode terminal are disposed on opposite sides with respect to the axes of said end tubes.

3. A gas laser tube according to claim 2, wherein said cathode terminal and/or said anode terminal comprise metal rods.

* * * * *